No. 743,053. PATENTED NOV. 3, 1903.
F. J. BALL.
REVERSING MECHANISM.
APPLICATION FILED SEPT. 12, 1903.
NO MODEL.

Witnesses:
George Barry Jr
Henry Thieme

Inventor:
Frederic J. Ball
by attorneys

No. 743,053. Patented November 3, 1903.

UNITED STATES PATENT OFFICE.

FREDERIC J. BALL, OF NEW YORK, N. Y.

REVERSING MECHANISM.

SPECIFICATION forming part of Letters Patent No. 743,053, dated November 3, 1903.

Application filed September 12, 1903. Serial No. 172,870. (No model.)

*To all whom it may concern:*

Be it known that I, FREDERIC J. BALL, a citizen of the United States, and a resident of the borough of Brooklyn, in the city and State of New York, have invented a new and useful Improvement in Reversing Mechanism, of which the following is a specification.

My invention relates to an improvement in reversing mechanism, and has for its object to provide certain new and useful improvements in the construction, form, and arrangement of the several parts whereby a very simple and effective mechanism is provided in which the constant rotary movement of a driving-shaft in one direction is caused to impart a rotary movement to a power-transmitting shaft in the same or the reverse direction at predetermined speeds at pleasure with a minimum amount of friction.

A further object is to provide a reversing mechanism comprising a rotary driving-shaft, a power-transmitting shaft, a pair of drums, a train of gearing connecting the drums and the shafts, one of the drums being directly controlled by a clutch and a brake and the other drum, which carries the intermediate gears, being fixed to the power-transmitting shaft.

A practical embodiment of my invention is represented in the accompanying drawings, in which—

Figure 1:
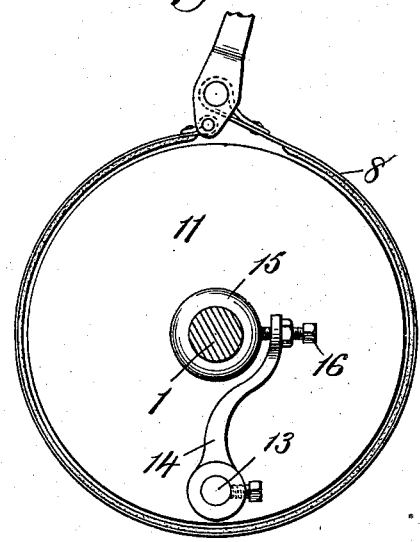
Figure 2:
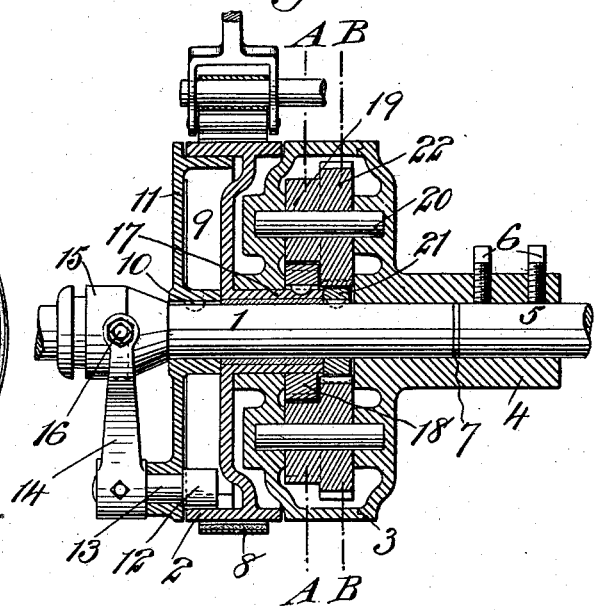
Figure 3:
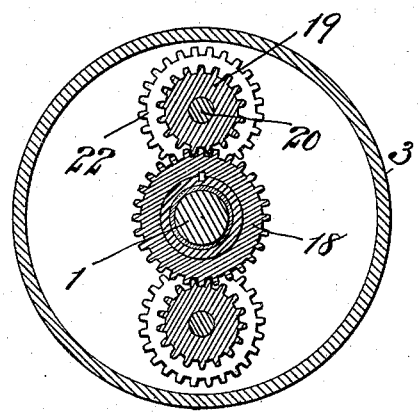
Figure 4:
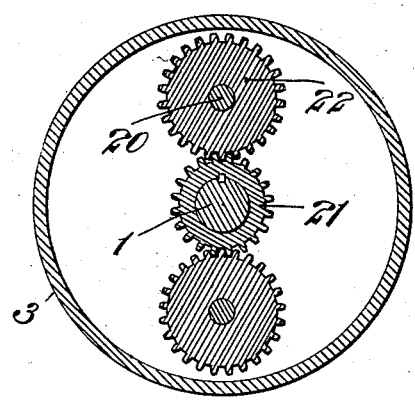

Figure 1 represents an end view of my improved reversing mechanism. Fig. 2 is a longitudinal central section through the same. Fig. 3 is a transverse section taken in the plane of the line A A of Fig. 2, and Fig. 4 is a transverse section taken in the plane of the line B B of Fig. 2.

1 designates the rotary driving-shaft, which may be caused to rotate continuously in one direction from any suitable source of power. (Not shown herein.) Two drums 2 and 3 are loosely mounted on the driving-shaft 1, the drum 2 in the present instance being open-ended and the drum 3 being inclosed. The drum 3 is provided with an extended central hub 4, within which is fixed the power-transmitting shaft 5, preferably by set-screws 6. This shaft 5 is in alinement with the shaft 1, and an antifriction-washer 7, of fiber or other suitable material, may be inserted between the ends of the two shafts.

A band-brake 8 is shown around the periphery of the drum 2 in position to brake and release the same. While I have shown a band-brake for this purpose, it is obvious that any other form of brake may be used, if found desirable.

The open drum 2 may be locked to and released from the rotary driving-shaft 1 by means of a clutch constructed and arranged as follows: The inner member of the clutch comprises a split ring 9, a hub 10, fixed to the shaft 1, and an end plate 11, connecting the base of the split ring to the hub. This split ring is normally contracted to bring its outer wall away from the inner face of the peripheral ring of the open drum 2. A cam 12 is interposed between the ends of the split ring 9 of the clutch, which cam is provided with a stem 13, mounted to rock in the end plate 11. A rocking arm 14 is fixed to the stem 13, the free end of which arm is engaged by a longitudinally-sliding cam-sleeve 15 on the shaft 1. The movement of the cam 12 may be accurately adjusted by a set-screw 16 in the free end of the arm 14, the inner end of which set-screw bears against the sliding cam-sleeve 15.

The drum 2 is provided with a hub 17, which extends into the interior of the drum 3. This hub 17 has an exteriorly-toothed gear 18 fixed thereto within the drum 3, which gear intermeshes with an externally-toothed gear 19, mounted on a stud-axle 20, carried by the closed drum 3.

The driving-shaft 1 has an externally-toothed gear 21 fixed thereto within the drum 3, which gear intermeshes with an externally-toothed gear 22, mounted on the stud-axle 20. The gears 19 and 22 are fixed to rotate together and may be made integral, if so desired, as shown. In the accompanying drawings I have shown two sets of externally-toothed gears 19 and 22 and their stud-axles 20, mounted within the closed drum 3 at points diametrically opposite each other for accurately balancing the drum and for distributing the wear between the said two sets of gears. In the accompanying drawings I have shown the gears as proportioned as follows: The gear 21, carried by the driving-shaft, is provided with twenty teeth; the gear 22, with which it meshes, is provided with twenty-five teeth; the gear 19, with seventeen teeth, and the gear 18, carried by the open drum with which the gear 19 intermeshes, is provided with twenty-eight teeth.

While the above is the proportion of the several gears as shown in the accompanying drawings, it is to be understood that by varying the relative sizes of the several gears the speed of the power-transmitting shaft may be varied with respect to the speed of the driving-shaft.

The operation of the mechanism is as follows: When the clutch is operated to lock the drum 2 to the driving-shaft 1 and the brake 8 is released, the power-transmitting shaft 5 will be driven in the same direction and at the same speed as the driving-shaft 1. When the clutch is released from the drum 2 and the brake 8 is operated to lock the drum against rotary movement, the power-transmitting shaft 5 will be rotated in the reverse direction to the driving-shaft 1 at a slightly-reduced speed. When both the clutch and the brake are released from engagement with the drum 2, the power-transmitting shaft 5 will remain at rest.

The mechanism which I have shown herein is particularly adapted for marine work where one speed forward and one speed reverse is required and where it is frequently desirable to disconnect the power-transmitting or propeller shaft from the driving or engine shaft.

What I claim is—

1. In combination, a rotary driving-shaft, a power-transmitting shaft, two drums, a gear fixed to the driving-shaft, a gear fixed to one of the drums and intermediate gears carried by the other drum intermeshing with the gears carried by the shaft and first-named drum, the last-named drum being fixed to the power-transmitting shaft, a clutch for locking the first-named drum to and releasing it from the driving-shaft and a brake for locking and releasing the said first-named drum at pleasure.

2. In combination, a rotary driving-shaft, a power-transmitting shaft, a closed drum fixed to the power-transmitting shaft, an open drum, gears carried by the driving-shaft and open drum within the closed drum and gears mounted within the closed drum intermeshing with the gears carried by the driving-shaft and open drum, a clutch fixed to the driving-shaft arranged to lock the open drum to and release it from the driving-shaft and a brake for locking and releasing the open drum.

In testimony that I claim the foregoing as my invention I have signed my name, in presence of two witnesses, this 9th day of September, 1903.

FREDERIC J. BALL.

Witnesses:
FREDK. HAYNES,
C. S. SUNDGREN.